(12) United States Patent
Abreo

(10) Patent No.: US 12,309,273 B2
(45) Date of Patent: May 20, 2025

(54) SYSTEM FOR AUTOMATICALLY DETERMINING AND CATEGORIZING AN EVENT FOR A FIREARM

(71) Applicant: Digital Analytics and Optical Systems, LLC, Blue Springs, MO (US)

(72) Inventor: Gabriel Abreo, Grain Valley, MO (US)

(73) Assignee: Digital Analytics and Optical Systems, LLC, Blue Springs, MO (US)

( * ) Notice: Subject to any disclaimer, the term of this patent is extended or adjusted under 35 U.S.C. 154(b) by 351 days.

(21) Appl. No.: 17/878,648

(22) Filed: Aug. 1, 2022

(65) Prior Publication Data

US 2023/0038950 A1 Feb. 9, 2023

Related U.S. Application Data

(60) Provisional application No. 63/229,173, filed on Aug. 4, 2021.

(51) Int. Cl.
*H04L 9/32* (2006.01)
*F41A 17/06* (2006.01)

(52) U.S. Cl.
CPC ............... *H04L 9/32* (2013.01); *F41A 17/06* (2013.01)

(58) Field of Classification Search
CPC ....... H04L 9/32; H04L 67/535; H04L 67/306; H04L 43/08; G06F 2218/12; G06F 21/6245; F41A 17/06; F41A 19/01; F41A 33/00
See application file for complete search history.

(56) References Cited

U.S. PATENT DOCUMENTS

| 11,408,699 | B2* | 8/2022 | Deng | F41A 17/06 |
| 2015/0296165 | A1* | 10/2015 | Sato | G08B 25/08 |
| | | | | 348/158 |
| 2015/0369554 | A1* | 12/2015 | Kramer | H04N 9/806 |
| | | | | 386/227 |
| 2017/0248388 | A1* | 8/2017 | Young | F41A 17/063 |
| 2021/0185138 | A1* | 6/2021 | Gant | H04L 63/0861 |

* cited by examiner

*Primary Examiner* — Ali S Abyaneh
(74) *Attorney, Agent, or Firm* — Erise IP, P.A.

(57) ABSTRACT

Systems and methods for analyzing and categorizing firearm-related events are provided herein. A data collection device may be attached to a firearm. The data collection device may be outfitted with sensors to track the movements and forces of the firearm. The movement and force data may be analyzed to categorize the event. Machine learning techniques may be used to stores relationships between the data and the events. A profile for a user may be created that learns the firearm handling techniques of the user. The data collection device may interface with body cameras and other external equipment and may be used in law enforcement scenarios. The data collection device may also be used with civilians for shot analysis.

20 Claims, 9 Drawing Sheets

SYSTEM FOR AUTOMATICALLY DETERMINING AND CATEGORIZING AN EVENT FOR A FIREARM

RELATED APPLICATIONS

This non-provisional patent application claims prior benefit, with regard to all common subject matter, of earlier-filed U.S. Provisional Patent Application No. 63/229,173, filed Aug. 4, 2021, and entitled "SYSTEM FOR AUTOMATICALLY DETERMINING AND CATEGORIZING AN EVENT FOR A FIREARM", which is hereby incorporated by reference in its entirety.

FIELD

Embodiments of the invention relate to systems and methods for automatically detecting and recording an event. More specifically, embodiments of the invention relate to automatically detecting firearm events, recording data from the firearm event, and analyzing the data to categorize the firearm event.

RELATED ART

Body-worn cameras are prevalent on law enforcement officers worldwide to increase the amount of data available for law enforcement encounters. Body-worn cameras are designed to provide a first-person perspective of a law enforcement officer's viewpoint during an event such as a law enforcement encounter where the law enforcement officer draws a weapon. Because human recollection in high-stress situations tends to be unreliable, it is vital to have as much data as possible about events occurring during these high-stress situations to help determine the facts of the situation. However, in some cases a body-worn camera may malfunction or become separated from the law enforcement officer and unable to provide an accurate recording of the event. Further, the body-worn camera may not have a field of view wide enough to capture all of the law enforcement officer's movements, such as actions taken with the officer's firearm.

Currently, there are no systems that record firearm-related data and match the data to an individual (e.g., law enforcement officer or first responder) or peripherals associated with the individual, such as the individual's vehicle (which may also carry a recording device, including a video recording device). In some situations when a law enforcement officer has an encounter with an armed suspect and shots are fired, it may be unclear who fired the shot and when the shot was fired. Forensics can be used to gather gunshot residue and extract fingerprints from a weapon. However, gunshot residue only indicates that someone fired a shot and fails to indicate which weapon a shot was fired with and when the shot was fired. Likewise, fingerprints can be unreliable and difficult to pull from a gun.

Additionally, there exists no reliable method for a data-driven approach to analyze and improve a user's shooting form using data collected from the firearm of the user. Civilian users may use firearms recreationally and wish to improve their shooting form and accuracy. The civilian users may compete in shooting contests or may generally be any person that wishes to improve their shooting skillset. Typical methods employ firing at a target and evaluating the pattern on the target and attempting to decipher why the user's bullet pattern is scattered or precise but not accurate. The user and a coach may employ various grips, stances, and breathing techniques to address any issues.

What is needed are systems and methods of automatically tracking and analyzing an event from the point of view of the firearm that can associate a particular shooting profile with a particular user. Furthermore, the shooting profile of the particular user may be used to analyze the user's shooting form and provide feedback to improve the user's shooting form.

SUMMARY

Embodiments of the invention solve the above-described problems by providing systems and methods for recording movement and force data from a firearm while in use and categorizing the movement and force data into events using a data collection device and an analysis engine. The data collection device may be attached to a handgun or other firearm to measure the movements of the firearm. Based on analyzing the data, categorized events such as, for example, "Finger Placed on Trigger" and "Shot Fired" may be extracted.

A first embodiment is directed to a system for attaching to a firearm and recording, analyzing, and categorizing events associated with the firearm, the system comprising a plurality of sensors associated with the firearm and configured to detect a manipulation of the firearm, a processor communicatively coupled to the plurality of sensors, a data store, and one or more non-transitory computer-readable media storing computer-executable instructions that, when executed by a processor, perform a method of recording, analyzing, and categorizing events associated with the firearm, the method comprising the steps of detecting the manipulation of the firearm, in response to the detection, recording a set of data using the plurality of sensors, comparing the set of data to one or more threshold values, and categorizing the set of data into at least one event based on the comparison of the set of data to one or more threshold values.

A second embodiment is directed to a method of recording, analyzing, and categorizing events associated with a firearm, the method comprising the steps of detecting, by a plurality of sensors associated with the firearm, a manipulation of the firearm, in response to the detection of the manipulation of the firearm, recording a set of data from the plurality of sensors, comparing the set of data to one or more threshold values, and categorizing the set of data into at least one event based on the comparison of the set of data to one or more threshold values.

A third embodiment is directed to one or more non-transitory computer-readable media storing computer-executable instructions that, when executed by a processor, perform a method of recording, analyzing, and categorizing events associated with a firearm, the method comprising the steps of detecting, by a plurality of sensors associated with the firearm, a manipulation of the firearm by a user, in response to the detection, recording a set of data from the plurality of sensors, comparing the set of data to at least one threshold value, categorizing the set of data into at least one event based on the comparison of the set of data to the at least one threshold value, storing the set of data in a data store, and generating a profile indicative of firearm handling habits associated with the user based at least in part on the set of data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
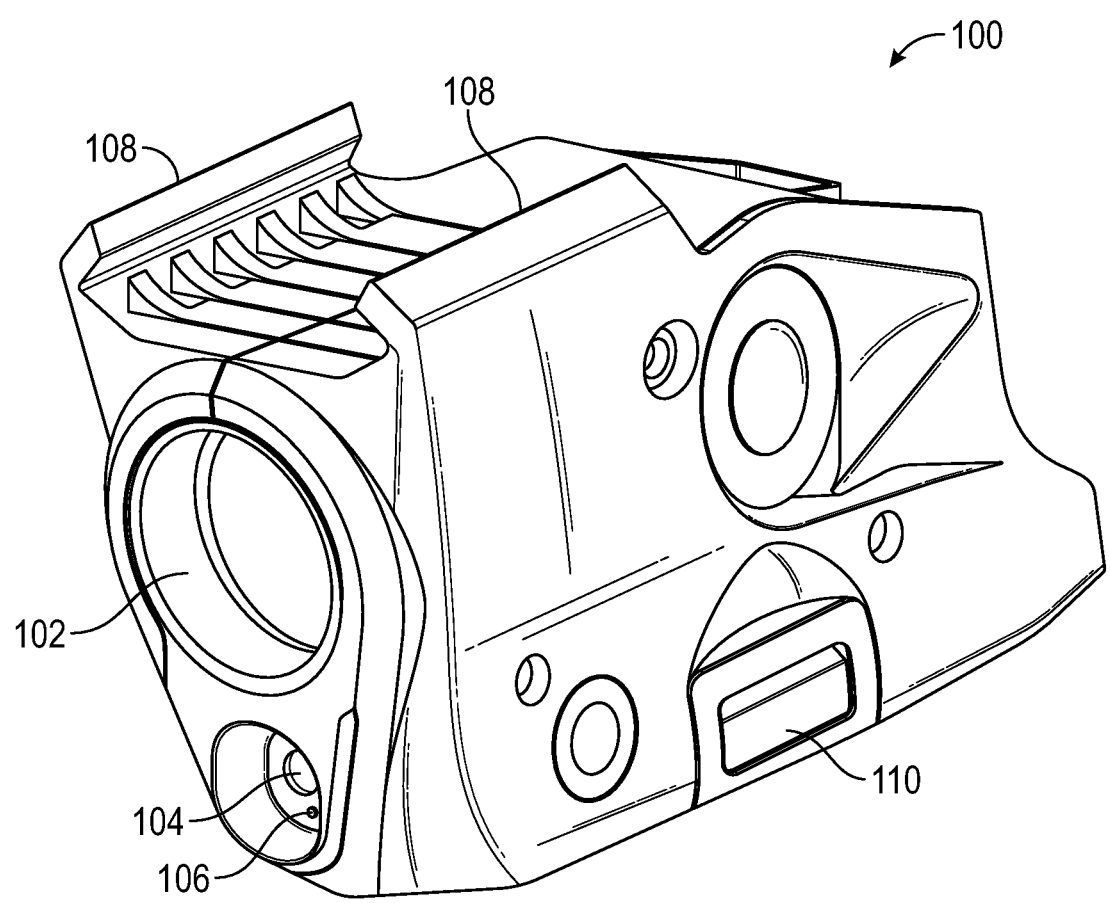
FIG. 1 depicts a data collection device for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments of the invention are broadly directed towards automatically recording data related to a firearm while the firearm is in use. A data collection device is described herein that may be attached to a weapon, such as on a rail of a handgun. The data collection device may comprise a plurality of sensors forming a microelectromechanical systems (MEMS) module to track and record the movements and applied forces of the weapon as the user manipulates the weapon. As used herein, a manipulation or handling of a firearm refers to a movement of the firearm from a known position (e.g., a holstered position) and any dynamics and/or kinematics associated with the movement. The movement may be a lateral, longitudinal, or a rotational movement about the X, Y, or Z axes or in the XYZ space. From the recorded data, an analysis engine may analyze the data and categorize the data into various events.

As the data collection device collects additional data about the user and the way the user handles the weapon, the analysis engine may create a profile characterizing the shooting trends and habits of the user. The analysis engine may use statistical algorithms and machine learning techniques, such as neural networks, to learn the habits of the user and generate the profile for the user. In some embodiments, the analysis engine comprises a decoding module to classify events, as will be discussed in more detail below. In the event that a set of data is received that does not match the generated profile of the owner/user of the weapon, the analysis engine may flag the set of data for further investigation.

The data collection device and the generated profile may be especially useful when used with law enforcement officers or first responders; however, civilians may also greatly benefit from the generated profile and shooting analytics provided by the data collection device described herein. The data collection device described herein may serve as an additional option for collecting data during an officer encounter. The data collection device may collect data that may not be captured by a body-worn camera. In some embodiments, the recorded data may be synchronized with a video recording from the body-worn camera. The synchronization may allow for the events detected and categorized by the analysis engine to be embedded, correlated, or otherwise associated with the body-worn camera footage, including video and audio recording and metadata, such as geoposition. As such, the amount of time by a person looking through the received data to find the video related to an event may be drastically decreased. However, the above description is not intended to limit uses of the data collection device to strictly law enforcement use cases. The data collection device may also be used for general firearms training and marksmanship endeavors.

The data collection device may be configured to begin recording data based on a detection of a triggering event. As used herein, in some embodiments, a triggering event is an event that triggers a signal to be sent to a sensor to begin recording data in response to the detection of the event. For example, the unholstering of the firearm may be a triggering event that signals various sensors to begin recording data. In some embodiments, the triggering event may be received from an external device or sensor, such as a body-worn camera, such that powering on (whether from a cold start or from a low-power mode) or triggering of recording of audio-video data by the body-worn camera also initiates or triggers recording by the data collection device. In some embodiments, a detection of a second triggering event may cause the data collection device to end data recording. For example, the detection of a holstering of the firearm may cause data recording to end. The holstering of the firearm may be detected by the movement of the firearm via accelerometers and gyroscopes on the data collection device, as further discussed below with respect to FIGS. 7-9. Furthermore, the holstering event may be detected by a sensor disposed on the holster and in wireless communication with the data collection device.

In some embodiments, the data collection device may utilize pre- and/or post-event recording to capture the moments leading up to the event. When pre- and/or post-event recording is enabled, sensors may continuously capture data and store it in a buffer for a predetermined amount of time, such as 30 seconds, 45 seconds, one minute, or up to 5 minutes. Once the predetermined amount of time has elapsed and no triggering event has been detected, the data may be removed from the buffer. Removal of data from the buffer may work in a "first in, first out" manner such that data that is recorded into the buffer first (i.e., the oldest data in the buffer) will leave the buffer first upon entry of new data into the buffer. However, in the event that a triggering event is detected, the data collection device may save the pre- and/or post-event data stored in the buffer, e.g., by moving to a permanent memory, along with the data recorded during the event to provide context about what led up to the triggering event or what occurred after the data recording ended. In yet other embodiments, all event data may be stored associated with a pre-set period of recording, such as eight hours corresponding to a user's work shift or other pre-set period of time.

FIG. 1 depicts an exemplary embodiment of data collection device 100. As shown, data collection device 100 comprises flashlight 102, camera 104, and laser 106 on a front face. In some embodiments, flashlight 102 is positioned above camera 104, and camera 104 is positioned above laser 106 such that flashlight 102, camera 104, and laser 106 are positioned vertically. However, any arrangement of the location of flashlight 102, camera 104, and laser 106 on data collection device 100 is considered within the scope hereof. For example, camera 104 may instead be positioned adjacent to laser 106. Likewise, in some embodiments, flashlight 102, camera 104, or laser 106, or a combination thereof, may be omitted from data collection device 100. For example, in some embodiments, data collection device 100 may comprise flashlight 102 and laser 106 and not include camera 104. In some embodiments, data collection device 100 may comprise additional components such as a microphone or a laser rangefinder.

In some embodiments, flashlight 102 comprises a white LED bulb operating at 500 lumens. In some embodiments, flashlight 102 may comprise an incandescent bulb. Broadly, flashlight 102 may operate at any lumen value, such as 50 lumens or 1000 lumens, and may emit various colors, such as yellow.

In some embodiments, laser 106 may aid a user in targeting the weapon. In some embodiments, laser 106 may be a red laser operable to emit a laser at a wavelength of 633 nanometers (nm). In some embodiments, laser 106 may emit a red laser at 638 nm or 650 nm, or a green laser operating at 532 nm. In some embodiments, laser 106 may be any of an orange laser, a yellow laser, a blue laser, a violet laser, or any other color laser now known or later developed. In some embodiments, laser 106 may be an infrared laser that may be viewed with the aid of night vision goggles or the like. Such an embodiment may be used for activities conducted in dark environments such as at night or in poorly lit buildings.

In some embodiments, camera 104 may be operable to record in 240p, 360p, 720p, 1080p, 2160p, 4320p, 8640p, or any other display resolution. Camera 104 may also be operable to detect in multiple spectra including visual, radio, radar, infrared, x-ray, gamma ray, or ultraviolet, as necessary. In some embodiments, camera 104 may continuously record video data for pre- and/or post-event recording. As described above, in pre- and post-event recording, camera 104 (or any other sensor configured for pre- and/or post-event recording) may hold data in a buffer for a predetermined amount of time. If a triggering event is detected, the data held in the buffer may be saved along with the data recorded during the event. In some embodiments, pre- and post-event recording may be configurable on a per sensor basis. For example, camera 104 may be configured for both pre-event and post-event recording while an accelerometer in data collection device 100 may be configured for only post-event recording.

Figure 2:
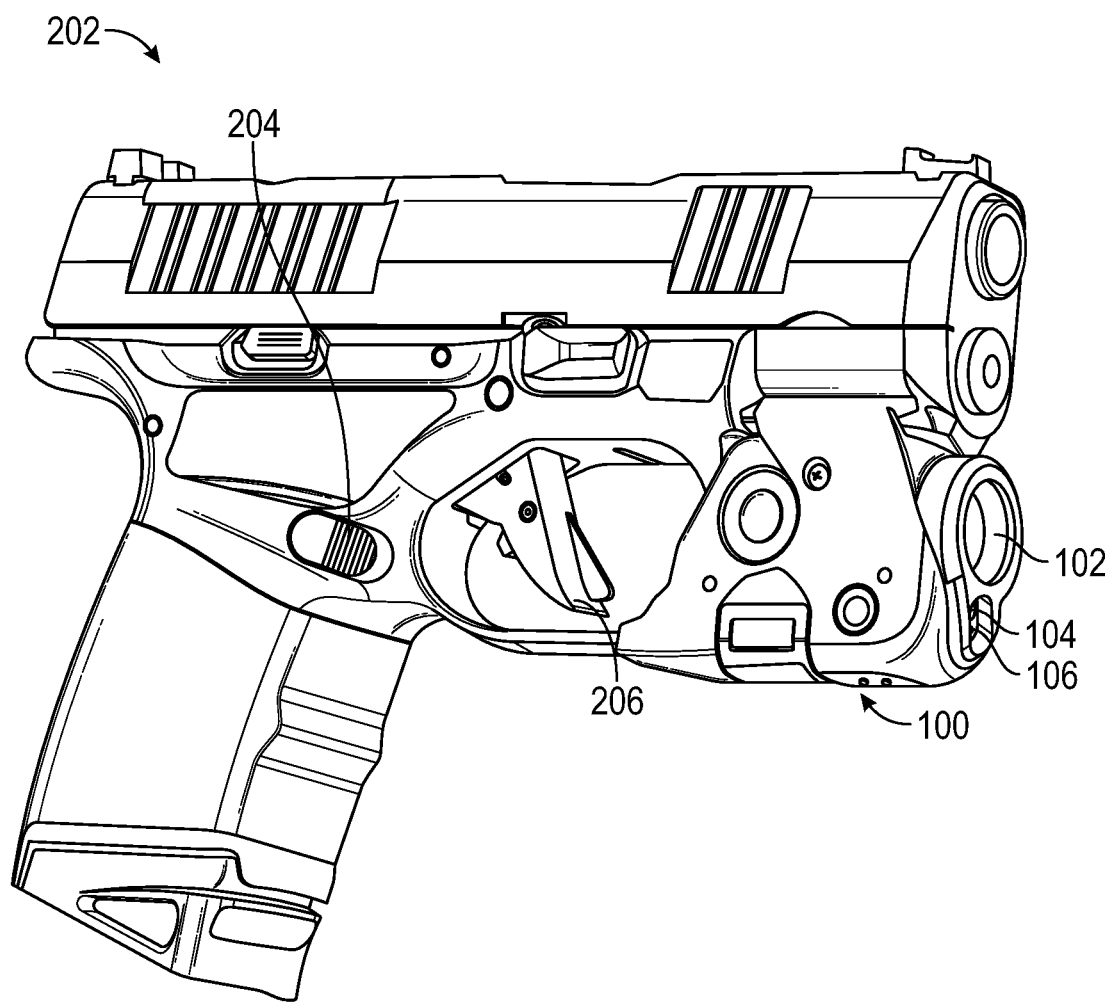
FIG. 2 depicts the data collection device attached to an exemplary firearm.

In some embodiments, data collection device 100 comprises rails 108 for attaching data collection device 100 to a handgun or other firearm, as shown with respect to FIG. 2. In some embodiments, rails 108 may be replaced with a different attaching structure depending on the firearm to which data collection device 100 is attached. For example, when data collection device 100 attaches to a rifle, rails 108 may be configured for attaching to the rifle. In some embodiments, data collection device 100 may be integrated with a separate firearm attachment, such as a rifle scope. Generally, the housing of data collection device 100 may be modified in any way to accommodate attaching to the relevant firearm.

Data collection device 100 may also comprise on/off button 110 to toggle flashlight 102, camera 104, and/or laser 106 on and off. On/off button 110 may be configured to toggle data collection device 100 between various configurations of flashlight 102, camera 104, and laser 106 being on and/or off. For example, pressing on/off button 110 a first time may turn on flashlight 102 while pressing on/off button 110 a second time may also turn on laser 106 without turning off flashlight 102. In some embodiments, on/off button 110 may also be configured to stop and start data recording. In some embodiments, data collection device 100 comprises multiple on/off buttons 110. For example, a first on/off button 110 may be used to toggle flashlight 102, camera 104, and laser 106, while a second on/off button 110 may be used to manually toggle data recording on and off.

In some embodiments, data collection device 100 may comprise one or more removable portions (not shown) on the housing to facilitate access to the internal components of data collection device 100. In some embodiments, data collection device 100 may comprise materials such as nylon, plastic, metal (e.g., aircraft-grade aluminum), or any combination thereof.

FIG. 2 illustrates data collection device 100 attached to firearm 202. As shown, data collection device 100 is attached to the rails of firearm 202. In some embodiments, firearm 202 may comprise safety 204 toggleable to allow firearm 202 to fire. Safety 204 is depicted here as a button, but safety 204 may instead comprise a lever or a switch or the like. In some embodiments, safety 204 may be integrated with the handle or grip of firearm 202 such that a user gripping the firearm in a firing position actuates safety 204. In some embodiments, the sensors of data collection device 100 may detect a user actuating safety 204, as will be described in more detail below. In some embodiments, the detection of the actuation of safety 204 may then be categorized by the analysis engine as, for example, "Safety Actuated." Likewise, the sensors may detect the user placing a finger on trigger 206. In some embodiments, when the user places a finger on trigger 206, the resultant force(s) on firearm 202 may be measured and any translation or rotation of firearm 202 resulting from the finger being placed on trigger 206 may also be measured by data collection device 100, as will be discussed in further detail with respect to FIG. 8.

In some embodiments, the data may be synchronized with external sensor data, such as video from a body-worn camera or a dashboard camera of a vehicle. In some embodiments, the external video data may be combined with, associated or correlated with, or embedded with the categorized events from data collection device 100 and the analysis engine. In some embodiments, the combination of the external video data with the categorized events may allow for a reviewer who is reviewing the video footage to jump directly to an event as categorized by the analysis engine. For example, the video footage from a law enforcement officer's body-worn camera may comprise multiple hours of footage gathered throughout the shift of the law enforcement officer involved in the above-described example encounter, while the encounter itself may have only lasted a few minutes. As such, when the categorized events are combined and synchronized with the video footage, the reviewer may be able to interact with a video player interface to jump directly to the event. In some embodiments, video data from camera 104 may be combined or associated with the external video data such that the two may play simultaneously in the same video player interface. In some embodiments, the video data from camera 104 may be combined with the external video data by storing metadata associated with the video data from camera 104 and metadata from the external video data, as will be discussed in further detail below. In some embodiments, the reviewer may be able to select a predetermined time to move to before the event occurs. For example, the reviewer may choose to jump to five minutes before the first shot was fired to view the video footage preceding the first shot. In some embodiments, the categorized events may be displayed on the video player interface such that the reviewer can select a button displaying "First Shot," for example, to jump directly to the first shot in the set of events. Therefore, some embodiments allow for the time spent reviewing video footage to be reduced because the reviewer may not have to sift through all the body-camera video footage to find and view the video of the event.

Figure 3:
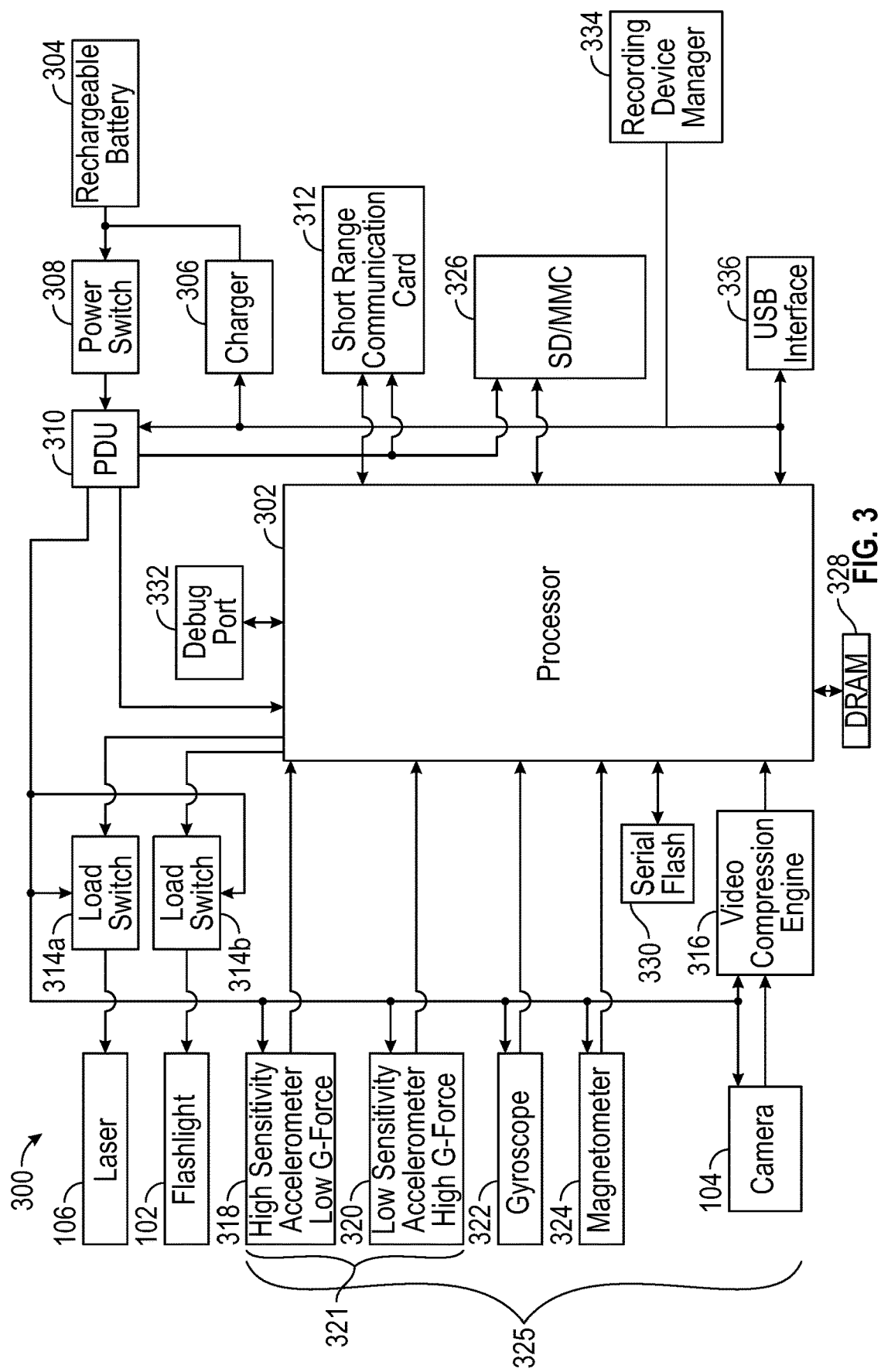
FIG. 3 depicts a block diagram of a hardware platform for some embodiments.

FIG. 3 depicts a block diagram 300 of hardware of data collection device 100 for some embodiments. As depicted, data collection device 100 may comprise processor 302, which in embodiments may comprise a plurality of processors 302. Processor 302 may comprise computer-readable media, such as non-transitory computer-readable media. Computer-readable media may include both volatile and nonvolatile media, removable and nonremovable media, and media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations. In some embodiments, processor 302 sends a signal to the various sensors to begin recording data in response to the detection of a triggering event.

In some embodiments, data collection device 100 may be powered by battery 304. In some embodiments, battery 304 may be a rechargeable battery such as lithium ion, lithium-ion polymer, nickel-metal hydride, or any other rechargeable battery now known or later developed. In some embodiments, battery 304 may instead be a primary battery such as a zinc-carbon battery or an alkaline battery. In some embodiments, as described above, data collection device 100 may have the housing configured for the removal and insertion of replacement batteries or any other components housed within data collection device 100. In some embodiments, for example, when battery 304 is a rechargeable battery, battery 304 may be recharged using charger 306. Charger 306 may take any form operable to recharge battery 304. Battery 304 may be actuated by power switch 308. In some embodiments, power switch 308 may be integrated or otherwise associated with on/off button 110. Once power switch 308 has been actuated and battery 304 turned on, power distribution unit (PDU) 310 may work to distribute the power from battery 304 to the various components of data collection device 100.

In some embodiments, data collection device 100 may also comprise short range communication card 312 that may transmit and receive signals and various data to and from other devices. In some embodiments, when data collection device 100 detects a triggering event, short range communication card 312 may signal external sensors to begin recording data. For example, short range communication card 312 may transmit a signal to a body-worn camera on a law enforcement officer to begin recording video with the body-worn camera. In some embodiments, the body-worn camera or a separate recording device may instead transmit a signal to short range communication card 312 that may be the triggering signal for data collection device 100. As another example, the law enforcement officer may instead trigger the body-worn camera to begin recording, and the body-worn camera may, in response, signal data collection device 100 via short range communication card 312 or a separate communications channel, to begin recording data. In some embodiments, data collection device 100 may be configured to ignore any subsequent triggering event that is detected after the triggering signal from the body-worn camera is transmitted. As such, the data recording may not be interrupted by the signaling of a subsequent triggering event. In some embodiments, data collection device 100 detects a second triggering event that causes a signal to be transmitted instructing relevant sensors to end data recording, such as the holstering of firearm 202.

Short range communication card 312 may also be communicatively coupled to a computing device such as a mobile phone, a laptop, or the like for transmitting data from data recording device 100 to an associated web, phone, or computer application. In some embodiments, data recording device 100 may have a companion application such that a user may quickly analyze and view the data recorded by data recording device 100. In some embodiments, short range communication card 312 may transmit the data to the companion application. In some embodiments, short range communication card 312 may transmit data directly to the computer hosting the analysis engine.

In some embodiments, short range communication card 312 may be replaced or accompanied by various network interface cards (NIC). Short range communication card 312 and NIC allow a computer to communicate over a network. The NIC may be any form of network interface known in the art, such as Ethernet, ATM, fiber, Bluetooth, or Wi-Fi (i.e., the IEEE 802.11 family of standards). The NIC connects a computer to a local network, which may also include one or more other computers and network storage, such as a data store. Generally, a data store may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein such as backup or versioning. Data stores can be local to a single computer, accessible on a local network, or remotely accessible over the Internet. The local network is in turn connected to the Internet, which connects many networks such as a local network, a remote network or directly attached to computers. In some embodiments, data collection device 100 may stream data as it is being recorded using short range communication card 312 or the like. In some embodiments, the data may be synchronized with data from external sensors, such as the body-worn camera, so that the two data sets may be viewed simultaneously in real time.

As described above with respect to FIG. 1, data collection device 100 may comprise flashlight 102, camera 104, and laser 106. To actuate flashlight 102 and laser 106, first load switch 314a and second load switch 314b may be utilized. PDU 310 may control first load switch 314a and second load switch 314b to provide power to flashlight 102, camera 104, laser 106, and any other components of data collection device 100.

In some embodiments, to reduce the amount of data to be stored and transmitted externally, video data from camera 104 may be compressed using video compression engine 316. In some embodiments, video compression engine 316 may compress video data using common video compression techniques. For example, the video data may be compressed using Advanced Video Coding (also referred to as H.264) techniques. In some embodiments, the video data may be compressed using High Efficiency Video Coding (also referred to as H.265) techniques. The video data may be saved in the form of .avi, .mp4, .wmv, .mov, .mpv, or any other video file format now known or later developed. In some embodiments, the video data may be encrypted to protect the privacy of the data. Broadly, the video data may be encrypted using any common video encryption algorithms such as, but not limited to, the Naïve Algorithm, the Pure Permutation Algorithm, the Zig-Zag Algorithm, or the Advanced Steam Encryption (AES). In some embodiments, the video data may not be encrypted. For example, when data collection device 100 is used for training or marksmanship purposes, the data may not be encrypted.

In some embodiments, data collection device 100 comprises low-force accelerometer 318 and high-force accelerometer 320 (also referred to collectively as accelerometers 321), gyroscope 322, and magnetometer 324 to measure the movements and forces acting on the attached firearm. The various sensors of data collection device 100 are also collectively referred to hereinafter as sensors 325. In some embodiments, low-force accelerometer 318 may be a MEMS accelerometer capable of measuring low G-forces while high-force accelerometer 320 may be a low-sensitivity MEMS accelerometer capable of measuring high G-forces. For example, low-force accelerometer 318 may measure movements of firearm 202 while holstered, such as those caused by a user moving, while high-force accelerometer 320 may capture high impact events such as firearm 202 being dropped and impacting the ground. Together, accelerometers 321 may be capable of detecting low-force events, such as the actuation of safety 204, and high-force events, such as the recoil from a shot being fired. In some embodiments, accelerometers 321 are both triaxial accelerometers and operable to detect acceleration along each of the x-axis, y-axis, and z-axis.

In some embodiments, gyroscope 322 may be a MEMS gyroscope sensor. Gyroscope 322 may detect rotational information such as an angle relative to a datum point. For example, gyroscope 322 may detect that the user is aiming the weapon at an angle of 5° with respect to horizontal. In some embodiments, gyroscope 322 is a triaxial gyroscope operable to detect rotation about the x-axis (pitch), y-axis (roll), and z-axis (yaw). In some embodiments, magnetometer 324 is a MEMS magnetometer. In some embodiments, magnetometer 324 may be used as a heading reference for accelerometers 321 and gyroscope 322 to indicate the direction in which firearm 202 is facing when the data is received. Magnetometer 324 may measure magnetic fields to determine a direction, such as north. The direction measured by magnetometer 324 may be measured in degrees, minutes, and seconds. With the data received from accelerometers 321, gyroscope 322, and magnetometer 324, events from an encounter may be extracted and determined as will be discussed in more detail below. In some embodiments, accelerometers 321, gyroscope 322, and magnetometer 324 may be packed into an inertial measurement unit (IMU). In some embodiments, the IMU may be a six-axis IMU or a nine-axis IMU.

In some embodiments, additional sensors may be present in data collection device 100. For example, data collection device 100 may also comprise a geolocation sensor such as a Global Positioning System (GPS) sensor. In some embodiments a GPS sensor may be used to detect a triggering event for data collection device 100. For example, the user, such as the law enforcement officer, may receive a call to respond to a disturbance at a known location or address. As such, when the GPS sensor detects the law enforcement officer has arrived at the location or has arrived within a predetermined proximity of the location, a signal may be transmitted to instruct data collection device 100 to begin recording data. Other additional sensors that may be present alone or in combination in some embodiments comprise biosensors or biomarkers, strain gauges, proximity sensors, pressure sensors, or any other analog or digital sensor. In some embodiments, biosensors, such as fingerprint sensors, blood-identification sensors, and sweat-identification sensors, may be used to help identify the user of firearm 202. In some embodiments, biosensors may be used to help identify the user of firearm 202. In some embodiments, a proximity sensor may be used as a triggering event to begin recording data. For example, a law enforcement officer may be sent to a known location, and data collection device 100 may be configured to begin recording data when the proximity sensor detects the law enforcement officer is within a predefined proximity of the location. A pressure sensor may be employed in some embodiments to measure an applied pressure. The pressure sensor may be used in conjunction with accelerometers 321 to determine forces applied to firearm 202. Likewise, a strain gauge may be employed in some embodiments to measure strains and stresses on firearm 202, such as stresses caused by firearm 202 impacting the ground. The strain gauge may be used to indicate if an abnormal stress, i.e., a stress above a set, predetermined threshold or a stress outside of a set, predetermined range, has been placed on firearm 202, which may indicate firearm 202 needs to be replaced or damaged.

In some embodiments, sensor data, such as the data received from accelerometers 321, gyroscope 322, and/or magnetometer 324, may be encrypted. In some embodiments, sensor data may be encrypted using any encryption algorithm now known or later developed for encrypting data such as symmetric key algorithms or asymmetric key algorithms. For example, the sensor data may be encrypted using the Triple Data Encryption Algorithm, the Diffie-Hellman key exchange protocol, the RSA encryption algorithm, the Blowfish algorithm, the Twofish algorithm, the Advanced Encryption Standard, or the like. In some embodiments, the sensor data may be stored in a database and the entire database or at least a portion of the database be encrypted. In some embodiments, databases may be encrypted using Transparent Data Encryption or the like.

In some embodiments, the sensor data and the video data are encrypted together. Encrypting the sensor data and the video data together may be done by combining the two data sets into one data set and then encrypting the combined data set. In some embodiments, each of the sensor data and the video data are encrypted separately and the two sets of encrypted data are combined into a single file.

In some embodiments, data received from sensors 325 is stored in memory card 326. Memory card 326 may be an SD card such as a microSD card, an MMC (MultiMediaCard) or the like, or any variation thereof that is operable to store data generated by sensors 325 of data collection device 100. In some embodiments, the data may be transmitted directly to an external memory or data store without being stored in memory card 326. For example, the data may be transmitted directly to the companion application or to a computer via short range communication card 312 for storage and/or analysis. In some embodiments, the sensor data may be streamed to a computer on a law enforcement vehicle. Data may also be stored additionally or separately in either of Dynamic Random-Access Memory (DRAM) 328 or serial flash 330. Data collection device 100 may also comprise debug port 332 for system monitoring. Debug port 332 may also be used to configure a clock tree for data collection device 100.

Data collection device 100 may also comprise or be communicatively coupled to a recording device manager 334. Recording device manager 334 may be a standalone component or integrated into another sensor such as camera 104. In some embodiments, recording device manager 334 may be integrated with processor 302. In some embodiments, recording device manager 334 may be in a remote location from data collection device 100. In such an embodiment, data collection device 100 may be communicatively coupled to recording device manager 334 such as through short range communication card 312. Recording device manager 334 may comprise a processor, a memory, and a data store, and may signal sensors 325 to begin recording and may also signal an external data store to store the recordings from sensors 325.

In some embodiments, after an event has finished recording, recording device manager 334 may facilitate the transfer of the recorded data to a data store. In some embodiments, recording device manager 334 may embed additional data. For example, the date and time of the recorded event may be embedded as metadata. In some embodiments, recording device manager 334 may transmit only a portion of the recorded data to the data store.

In some embodiments, recording device manager 334 may facilitate communications with external devices and sensors 325. For example, when data collection device 100 is configured to interact with an external body-worn camera, recording device manager 334 (or processor 302) may signal the body-worn camera to begin recording data. In some embodiments, the external body-worn camera may signal recording device manager 334 instructions to signal sensors 325 and components of data collection device 100 to begin recording data.

Data collection device 100 may also comprise a Universal Serial Bus (USB) interface 336. In some embodiments, USB interface 336 may serve as charger 306 for battery 304. In some embodiments, USB interface 336 may be used to transmit data from data collection device 100 to an external device such as a computer or a mobile phone for data storage and/or data analysis using the analysis engine. USB interface 336 may be used for various purposes in data communication such as, for example, data visualization, transmitting sensor data, transmitting processed data, and receiving configuration data. Any received and transmitted data may be provided in any format customizable by the user.

Figure 4:
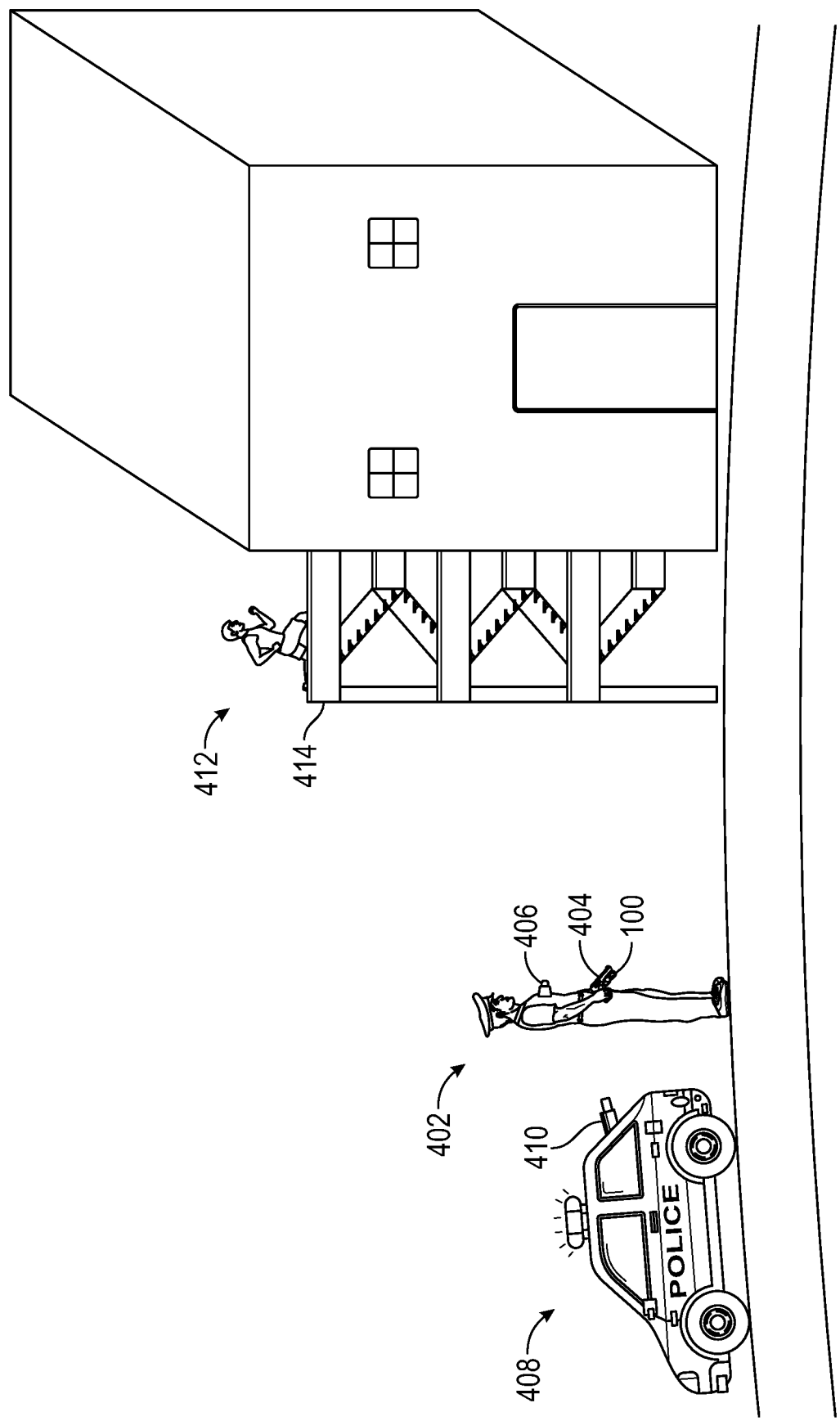
FIG. 4 depicts an exemplary scenario in which law enforcement may use the data collection device.

FIG. 4 depicts an exemplary embodiment in which a law enforcement officer or other law enforcement officer may use data collection device 100. In this example scenario, law enforcement officer 402 is responding to an incident at the building. As shown, law enforcement officer 402 may have handgun 404 drawn as law enforcement officer 402 approaches the building. Law enforcement officer 402 may also be outfitted with body-worn camera 406. In some embodiments, body-worn camera 406 may be communicatively coupled and synchronized with data collection device 100 that is attached to handgun 404. As such, when data collection device 100 detects a triggering event, data collection device 100 may signal body-worn camera 406 to also begin recording data. In some embodiments, the reverse may be true as well. For example, body-worn camera 406 may be configured to begin recording when law enforcement officer 402 leaves law enforcement vehicle 408. In some embodiments, body-worn camera 406 may instead signal data collection device 100 to begin recording. Likewise, data collection device 100 may also be communicatively coupled with dashboard camera 410, various other external sensors, and recording device manager 334 associated with law enforcement vehicle 408.

At the moment depicted in FIG. 4, the above-described sensors 325 may record data related to the dynamics and kinematics of handgun 404 as it is manipulated by law enforcement officer 402. For example, sensors 325 may have detected a triggering event related to law enforcement officer 402 unholstering handgun 404 or a triggering event from law enforcement officer 402 moving into a predefined proximity of the building. The analysis engine may have also decoded the movement data related to handgun 404 being moved to the position shown in FIG. 4 and categorized the movement as "Gun Aimed in Safe Position," for example. In some embodiments, the analysis engine may continuously decode data into various events as the data is being recorded. In some embodiments, the data is categorized after the series of events has taken place.

The example scenario depicted in FIG. 4 also illustrates suspect 412 on fire escape 414. Law enforcement officer 402 may have been called to the building to apprehend suspect 412. In some embodiments, data collection device 100 may detect and categorize various events using sensors 325, such as law enforcement officer 402 holstering and unholstering handgun 404. In some embodiments, data collection device 100 may detect when a shot is fired, how many shots are fired, a time elapsed between shots, a changing of a clip, pulling a slide back on handgun 404, chambering handgun 404, and various other shot and firearm data. Data collection device 100 may also record data such as the angle of handgun 404 when it was fired.

In some embodiments, data collection device 100 detects when a shot is fired. Data collection device 100 may detect a high-force event using sensors 325. Along with the detection of a high-force event, data collection device 100 may also have detected other data providing context for categorizing the high-force event as a fired shot. For example, data collection device 100 may have detected that law enforcement officer 402 was aiming handgun 404 in a firing position just prior to the detection of the high-force event. Thus, data collection device 100 may categorize the high-force event as a shot fired in part due to the context of knowing law enforcement office 402 was aiming handgun 404 just prior to the high-force event. In some embodiments, data collection device 100 may analyze the impulse response in all linear directions (e.g., x, y, and z directions) when analyzing recorded data and categorizing events.

Data collection device 100 may also be configured to store metadata, such as a time associated with the high-force event, or a time relative to a previous event. For example, the detection of an event (e.g., unholstering of handgun 404 or law enforcement officer 402 exiting law enforcement vehicle 408) may start a timer associated with data collection device 100 such that all subsequently detected events have an associated elapsed time since the event. As described above, data collection device 100 may interface with other external sensors to detect triggering events. For example, the door of law enforcement vehicle 408 may have a sensor that records every time the door is opened and closed. As such, data collection device 100 may be configured to receive a signal from the sensor to begin recording. In such a way, all subsequent events may be stored with a time relative to the door opening (e.g., the first shot was fired 20 seconds after the door of law enforcement vehicle 408 was opened).

Accordingly, data collection device 100 may detect a series of fired shots and a time elapsed between each shot. Data collection device 100 may detect a return of handgun 404 to the aiming position and a second high-force event substantially similar to the first high-force event. Thus, the second high-force event may be also categorized as a fired shot and may be stored with associated metadata. As such, data collection device 100 or a computer to which data from data collection device 100 is sent, may analyze the stored metadata to determine an elapsed time between the two shots. Magnetometer 324 may detect where handgun 404 was facing when fired. For example, magnetometer 324 may detect that law enforcement officer 402 was facing directly north when the first shot was fired and turned 45° to fire the second shot, thus indicating that the target at which law enforcement officer 402 fired at moved between the first and second shots.

In some embodiments, data collection device 100 may record and store data indicative of an angle of handgun 404 at any point using gyroscope 322. In some embodiments, the angle of handgun 404 may be recorded any time law enforcement officer 402 or any other user raises handgun 404 in an aimed position. The angle may be measured relative to a datum plane. For example, a plane parallel to the ground may be used as the data plane. As such, law enforcement officer 402 aiming handgun 404 straight ahead with their arms parallel to the ground, would be considered to be aiming at 0°.

As yet another example, data collection device 100, along with the analysis engine, may determine that, in an example scenario, three shots were fired by law enforcement officer 402 at suspect 412. From the shot data, the analysis engine may then determine that the first two shots were fired one second apart, that law enforcement officer 402 fired the first two shots at an angle of 0° relative to horizontal, and that the third shot was fired 10 seconds after the second shot at an angle of 45° relative to the horizontal. The shot data and categorization may provide evidence that suspect 412 moved above law enforcement officer 402 after the second shot was fired. Data collection device 100 may have recorded at least one of translation, rotation, angle, or applied force, or a combination thereof on handgun 404 as these events played out and sent the data indicative of the events to the analysis engine to classify the events. As such, after the events have ended, the shot data and the classifications may be provided along with any video data collected from body-worn camera 406 and dashboard camera 410 as additional evidence relating to the encounter.

In some embodiments, the data may be synchronized with external sensor data, such as video from body-worn camera 406 or dashboard camera 410. In some embodiments, the external video data may be combined with the categorized events from data collection device 100 and the analysis engine. In some embodiments, combination of the external video data and the categorized events may allow for a reviewer who is reviewing the video footage to jump directly to an event as categorized by the analysis engine. For example, the video footage from body-worn camera 406 of law enforcement officer 402 may comprise multiple hours of footage gathered throughout the shift of law enforcement officer 402 involved in the above-described example encounter, while the encounter itself may have only lasted a few minutes. As such, when the categorized events are combined and synchronized with the video footage, the reviewer may be able to interact with a video player interface to jump directly to the event. In some embodiments, video data from camera 104 may be combined with the external video data from body-worn camera 406 or another external video camera such that the two may play simultaneously in the same video player interface. In some embodiments, the reviewer may be able to select a predetermined time to move to before the event occurs. Each categorized event may be timestamped to allow for selection in the video player. For example, the reviewer may choose to jump to five minutes before the first shot was fired to view the video footage preceding the first shot. In some embodiments, the categorized events may be displayed on the video player interface such that the reviewer can select a button displaying "First Shot," for example, to jump directly to the first shot in the set of events. Therefore, some embodiments allow for the time spent reviewing video footage to be reduced because the reviewer may not have to sift through all the body-camera video footage to find and view the video of the event.

Figure 5:
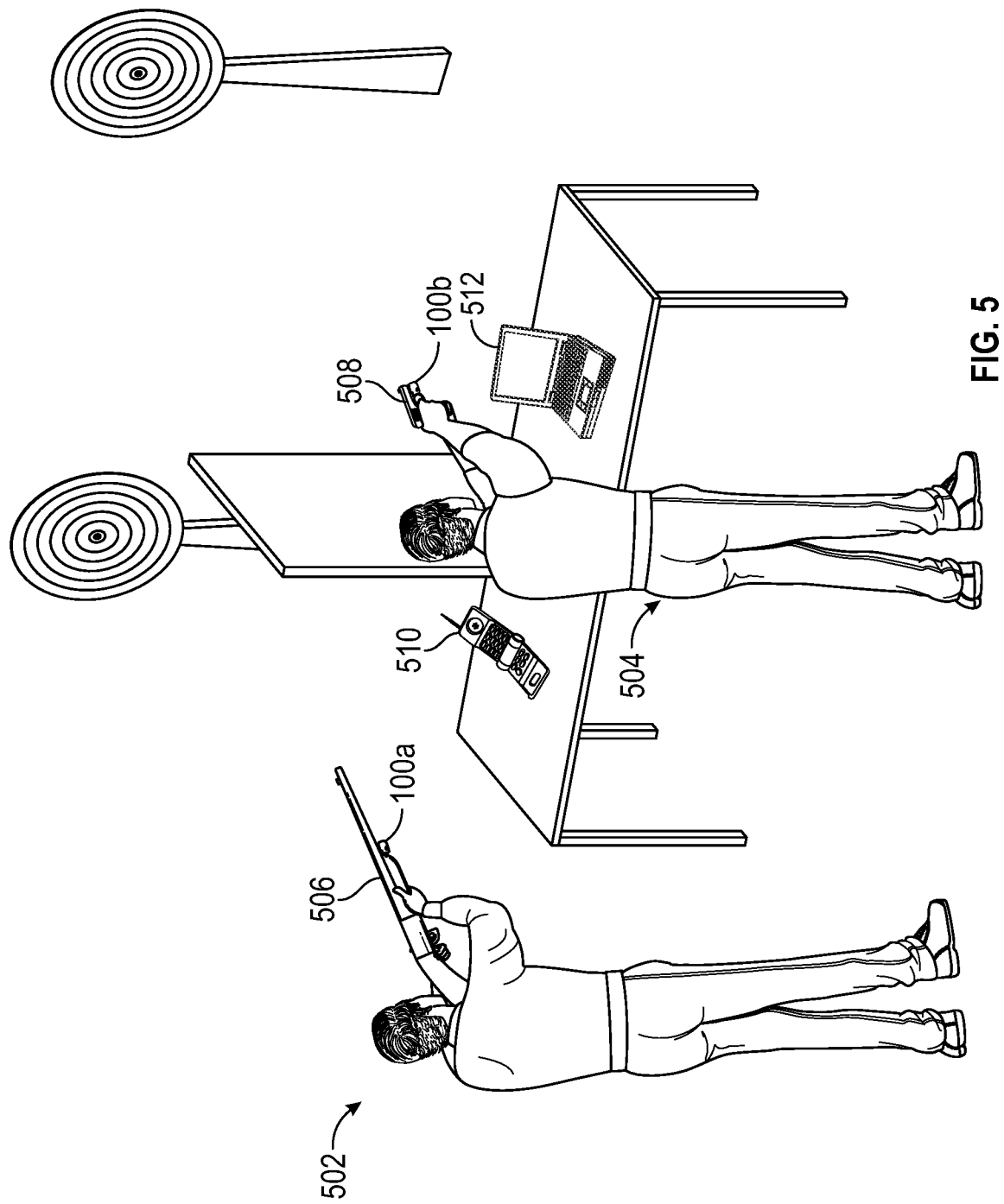
FIG. 5 depicts an exemplary scenario in which civilians may use the data collection device.

FIG. 5 depicts an exemplary embodiment in which data collection device 100 may be utilized in applications outside of law enforcement. As shown, first civilian 502 and second civilian 504 are at a firing range and, first civilian 502 has first data collection device 100a attached to rifle 506 while second civilian 504 has second data collection device 100b attached to handgun 508. Additionally, first data collection device 100a is communicatively coupled to mobile phone 510, and second data collection device 100b is communicatively coupled to laptop 512. In some embodiments, data collection device 100 may be communicatively coupled wirelessly via short range communication card 312 or the Internet or coupled via a wired connection.

In some embodiments, first civilian 502 and second civilian 504 may be using first data collection device 100a and second data collection device 100b to improve their marksmanship skills. First civilian 502 and second civilian 504 may fire a shot or a round of shots and then view the sensor data recorded by accelerometers 321, gyroscope 322, and magnetometer 324 to analyze their shots. The shot data may be presented to first civilian 502 and second civilian 504 in graphical form. For example, the analysis engine may create a graph or graphs comparing the acceleration along each of the x-axis, the y-axis, and the z-axis over time. The sensor data may then be used to provide suggestions and/or categorize the shooting trends of first civilian 502 and second civilian 504. For example, the data may show a slight acceleration in the x-direction just before a shot is fired for first civilian 502. The analysis engine may recognize the slight acceleration as first civilian 502 jerking rifle 506 slightly before pulling the trigger. The analysis engine may then provide a suggestion or otherwise call out the sensor data to first civilian 502 via a graphical user interface displaying the graph. First civilian 502 may then use the sensor data and associated information to help correct the shooting form. Data collection device 100 may detect other abnormalities in the shooting form of users. For example, accelerometers 321 in conjunction with gyroscope 322 may detect that second civilian 504 is torquing handgun 508 just before firing. The torquing may be the result of second civilian 504 pulling handgun 508 with their trigger. As will be discussed in more detail below, based on the received data, the analysis engine may analyze the data from accelerometers 321 and gyroscope 322 and determine that the data is indicative of a user torquing the gun.

In some embodiments, data collection device 100 may be configured to begin recording without the detection of a triggering event. In some embodiments, data collection device 100 may comprise a button or the like to toggle data recording on and off. In some embodiments, first civilian 502 and second civilian 504 may use a companion application, such as an application stored on mobile phone 510 or laptop 512 to signal first data collection device 100a and second data collection device 100b to begin recording data.

Figure 6:
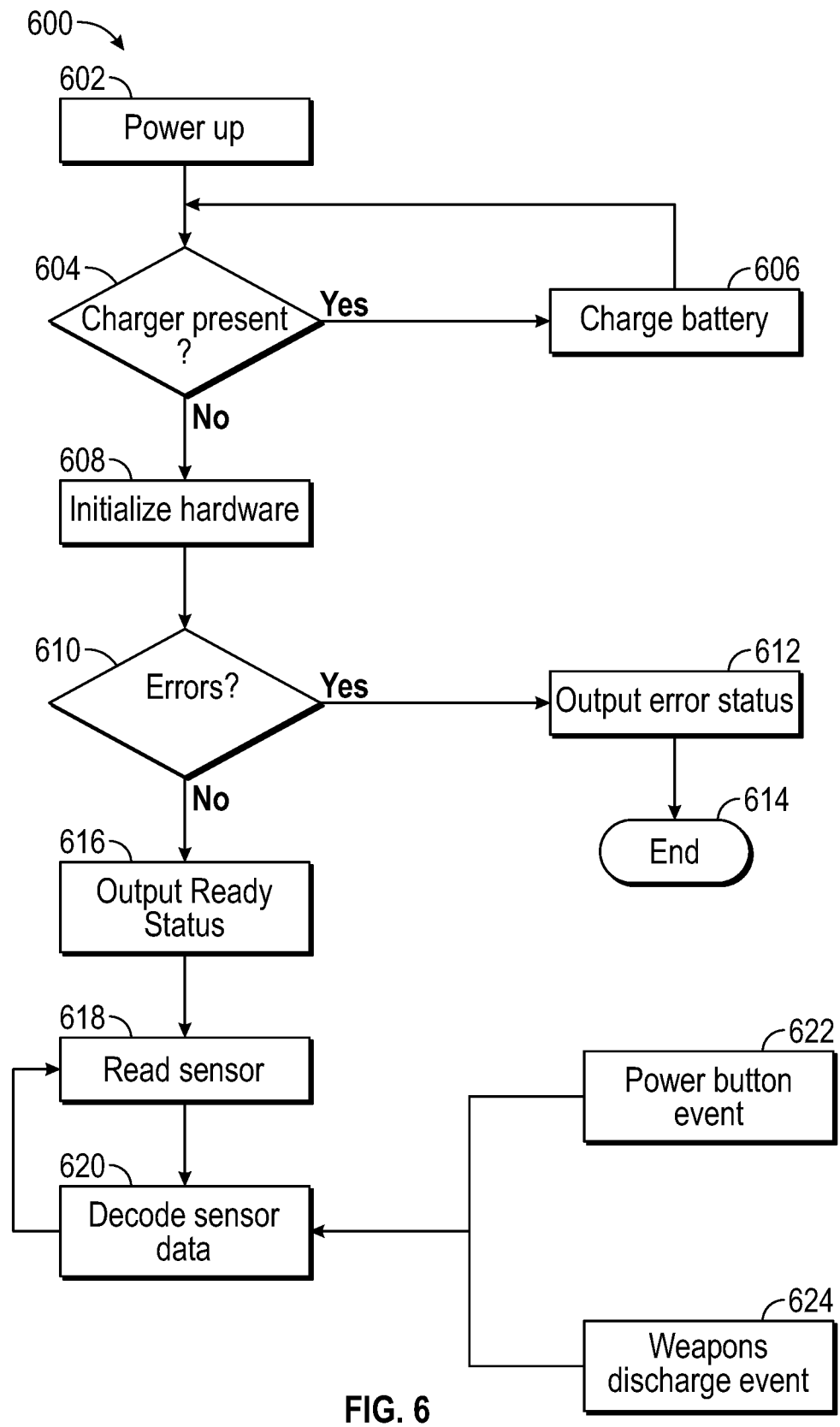
FIG. 6 depicts an exemplary flow chart for the operations of the data collection device.

FIG. 6 illustrates a method 600 for operation of data collection device 100 for some embodiments. At step 602, data collection device 100 may be powered on. In some embodiments, powering on may be done by actuation of on/off button 110. Next, at step 604, it may be determined whether charger 306 is present and charging data collection device 100. If charger 306 is present, at step 606 battery 304 is charged. In some embodiments, data collection device 100 may be operable while being charged.

At step 608, the hardware of data collection device 100 may be initialized. In some embodiments, the initialized hardware may be each component, or a subset of components described with respect to FIG. 3. Next, at step 610, an error check may be performed. If any errors are detected, an error status may be outputted to the user at step 612. In some embodiments, the output error status may be auditory, such as a series of beeps. In some embodiments, the error status may be transmitted and displayed to the companion application. At step 614, method 600 ends in response to the error detection.

If no errors are detected, processing moves to step 616, where a ready status is outputted. In some embodiments, the ready status may be communicated auditorily, via beeps or the like. At step 618, data collection device 100 then reads data from the sensors 325. Step 618 may be initiated in response to the detection of a triggering event as described above. Once sensor data has been read, the sensor data is decoded into events at step 620. Steps 618 and steps 620 will be discussed in more detail with respect to FIGS. 7-9.

Method 600 may also comprise step 622, where a power button event is detected, and step 624, where a weapons discharge event is detected. In some embodiments, steps 622 and/or step 624 are handled differently than other sensor data or events. In some embodiments, each time on/off button 110 is actuated, metadata, such as the time and date of the actuation is recorded. In some embodiments, metadata such as an identifier associated with firearm 202, an identifier associated with a user of firearm 202 (e.g., law enforcement officer 402), a GPS location, or any other useful metadata may be stored. Likewise, in some embodiments, a weapons discharge may be processed separately by data collection device 100 and the analysis engine.

Figure 7:
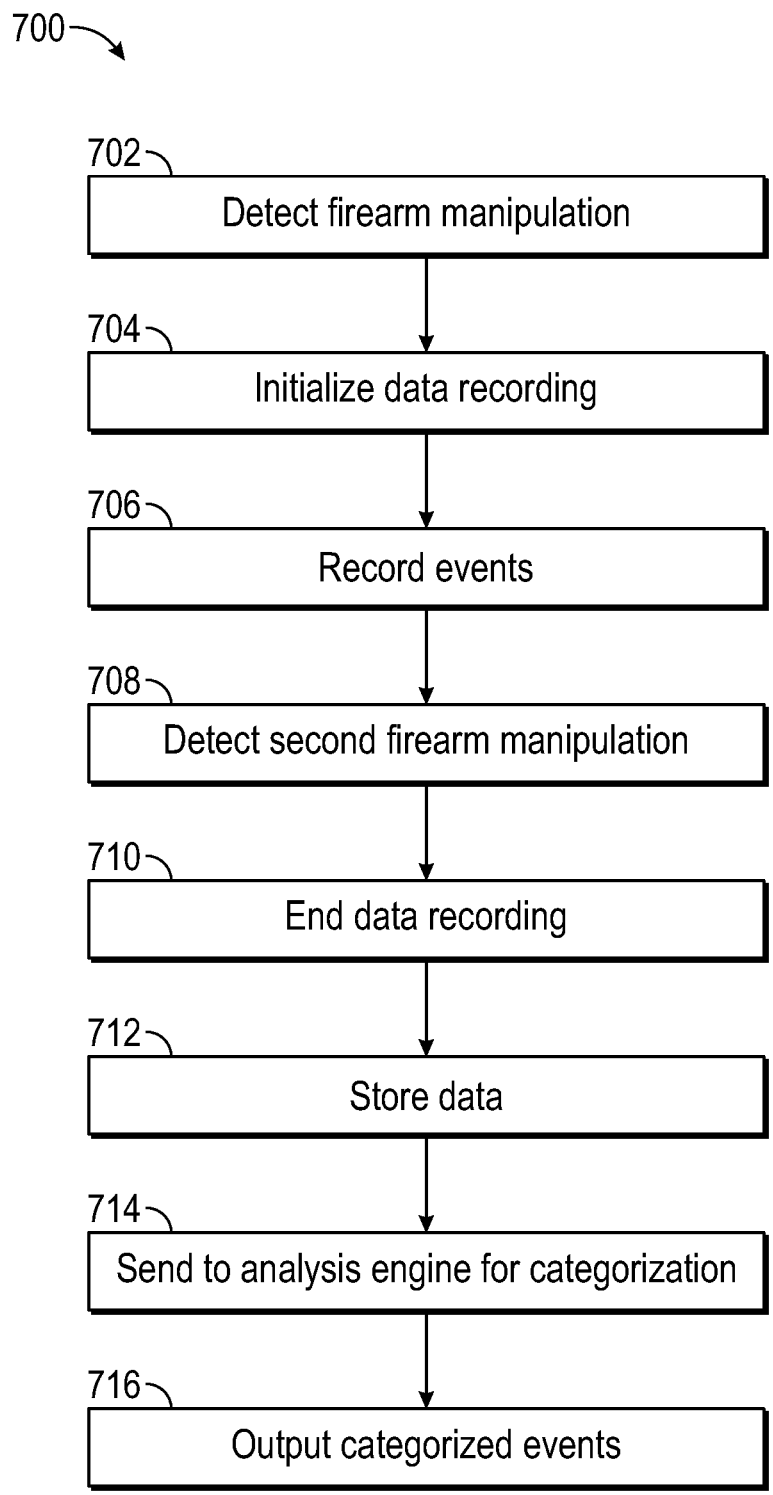
FIG. 7 depicts an exemplary flow chart presenting a method for recording and categorizing data of a firearm event.

FIG. 7 depicts an exemplary method 700 for recording data of a firearm and categorizing events from the recorded data for some embodiments. Method 700 may correspond to steps 618-624 of method 600. At step 702, a manipulation of firearm 202 may be detected. The manipulation of firearm 202 may act as a triggering signal. In some embodiments, manipulation of firearm 202 may be at least one of an unholstering of firearm 202, an actuation of safety 204, a detection of an applied force to firearm 202 (e.g., a hand placed on the grip), or the like. In some embodiments, the manipulation of firearm 202 to initialize data recording may be configurable by the user. In some embodiments, data collection device 100 may be configured such that multiple manipulations of firearm 202 may act as the triggering signal. In some embodiments, step 702 may be omitted such as when data collection device 100 is configured to be triggered by an external device.

At step 704, data collection device 100 may initialize data recording. The data recording initialization may be in response to the detection of the manipulation of the firearm. In some embodiments, a signal may be sent from processor 302 to the plurality of sensors 325 to begin recording data. When pre-event recording is enabled, the data in the pre-event recording buffer may be stored at step 704. In some embodiments, data recording is initialized in response to a triggering signal from an external device. For example, data collection device 100 may be in communication with dashboard camera 410. Dashboard camera 410 may be configured to begin recording based on various triggering events, such as a motion detection or an object recognition. When dashboard camera 410 detects a triggering event, dashboard camera 410 or a separate recording device manager may signal data collection device 100 to begin recording data. Data recording may also be triggered manually. In some embodiments, data collection device 100 may comprise an actuator that, when actuated, initializes data recording. For example, the actuator may be a button, a toggle, a switch, or any other mechanical actuator.

At step 706, data collection device 100 records data. In some embodiments, a plurality of events is recorded during the recording session. For example, once data collection device 100 detects the manipulation of firearm 202, the user may raise firearm 202, aim firearm 202, and fire shots with firearm 202. Each of these events may be recorded in one data set and subsequently categorized by the analysis engine. Data collection device 100 may continue to record data until a signal or other instruction is received to end the recording. The data may be recorded using accelerometers 321, gyroscope 322, and magnetometer 324 along with any additional sensors 325 present. Each sensor may collect and record data triaxially as described above.

At step 708, data collection device 100 may detect a second manipulation of firearm 202 indicative of a second triggering event. The second manipulation of firearm 202 may cause data collection device 100 to transmit instructions to end the data recording. In some embodiments, the second manipulation of firearm 202 is a detection of the user holstering firearm 202. In some embodiments, no second manipulation of firearm 202 is detected and instead the second triggering event is received externally, such as a signal transmitted from the body-worn camera or the companion application. The second triggering event may also be manually triggered. For example, when a physical switch or the like is used to begin recording data, a second actuation of the physical switch may act as the second triggering event and instruct data collection device 100 to end data recording. In some embodiments, data collection device 100 is configured to run on a timer. Data collection device 100 may be configured to record data for a preset amount of time once initially triggered and then to end data recording once the preset amount of time has elapsed. When used in marksmanship applications, the preset amount of time may be useful when the user knows it typically takes a certain amount of time to fire one round of shots. In some embodiments, battery 304 is configured to go into a low power mode upon receiving a signal indicative of the second triggering event or when data recording ends.

At step 710, data collection device 100 ends data recording. Once the second triggering event has been detected, a signal may be transmitted to processor 302 and/or sensors 325 to end data recording. In some embodiments, processor 302 signals the plurality of sensors 325 to end recording data. When post-event recording is enabled, sensors 325 may instead receive a signal to continue recording data for a set amount of time. For example, if post-event recording is configured to record for an additional minute, sensors 325 may receive a signal to end recording in a minute at step 710.

At step 712, data collection device 100 stores the data. In some embodiments, the data is stored on data collection device 100 such as on memory card 326. In some embodiments, the data is instead immediately transferred to an external computing device. The transfer may be done over short range communication card 312 (e.g., BLUETOOTH®), wirelessly, or via a wired connection as described above. In some embodiments, the data may be stored both locally on data collection device 100 and stored remotely.

At step 714, the data is transmitted to the analysis engine for categorization. In some embodiments the analysis engine is integrated with data collection device 100, such as on processor 302. The analysis engine may be configured to categorize the data into distinct events. In some embodiments, the analysis engine may comprise a machine learning algorithm or a neural network. In some embodiments, the analysis engine is implemented via TensorFlow. In some embodiments, the analysis engine is implemented using a convolutional neural network, a recurrent neural network, an artificial neural network, a Long Short Term Memory network, or a combination thereof. To accurately categorize the data into events, the analysis engine may be trained. The analysis engine may be trained using a set of ground truth data. The ground truth data may be used to increase the training speed of the analysis engine. The weights for the analysis engine may be determined using the backpropagation method, or any other method for determining weights in a neural network. The analysis engine may be optimized using an optimization algorithm such as gradient descent or stochastic gradient descent (SGD), or any variants and extensions thereof. For example, the optimization algorithm may comprise one of or a combination of implicit updates SGD, the momentum method, averaging SGD, the adaptive gradient algorithm, Root Mean Square Propagation, Adaptive Moment Estimation, or backtracking line search.

Once trained, the analysis engine may categorize the received data into a plurality of events using a decoding module, as will be discussed below. In some embodiments, the events are predefined or defined during the training process of the analysis engine. The decoding module may receive the recorded triaxial data for each of accelerometers 321, gyroscope 322, and magnetometer 324 as described above. To categorize the data, the decoding module may classify the received data for each axis. The classification may be a binary classification where the received value may be compared against a threshold value. In some embodiments, the threshold value may vary for each axis of each sensor. For example, the threshold value for acceleration in the y-axis for low-force accelerometer 318 may be 1 g (i.e., 9.8 m/s$^2$) and 0.5 g in the x-axis, while the threshold value for acceleration in the y-axis for high-force accelerometer 320 may be 10 g. In some embodiments, the threshold values may vary as the analysis engine is trained and receives more data. In some embodiments, the threshold values may vary for each user. As described above, the analysis engine may create a profile for the individual user of data collection device 100. As a part of the profile creation process, the analysis engine may configure the threshold values for the user. The analysis engine may compare received data sets for the user to the ground truth data as a starting point for creating the profile. The ground truth data may represent a baseline set of data. In some embodiments, the ground truth data is an average set of data from a plurality of data sets of various users handling firearm 202. In some embodiments, the profile may be stored on data collection device 100 or in a separate data store. In some embodiments, profiles are stored on a centralized data server such that new data sets may be compared against a plurality of profiles.

If the received value falls below the threshold value, the received value may be initialized to 0, and if the received value lies above the threshold, the received value may be initialized to 1. As such, the data may be transformed from a plurality of floating-point numbers and/or integers to a binary classification of ones and zeroes. After thresholding (also referred to as zero-levelling), the analysis engine may have an array of ones and zeroes. Based on the array of ones and zeroes, the analysis engine may categorize the data into an event. For example, after zero-levelling, the value for acceleration in the y-axis for low-force accelerometer 318 may be 1 and every other measured data value may be 0, thus indicating that only a small acceleration in the y-direction was above the threshold mark. As such, based on historical data and the training of the analysis engine, the analysis engine may categorize the small acceleration as a holster movement. As another example, zero-levelling may instead categorize the x-axis acceleration for low-force accelerometer 318 as 1 and every other measured data value as 0, thus the analysis engine may categorize this x-acceleration event as an actuation of safety 204 that caused a slight movement of firearm 202 in the x-direction.

At step 716, the analysis engine may output the categorized events. In some embodiments, the categorized events may be combined with other external data such as video recordings from a body-worn camera. As such, as described above, an observer can simultaneously view the video footage and the categorized events. In some embodiments, the data is outputted in various formats. The data may also be presented in graphical form as described below with respect to FIG. 7.

Figure 8:
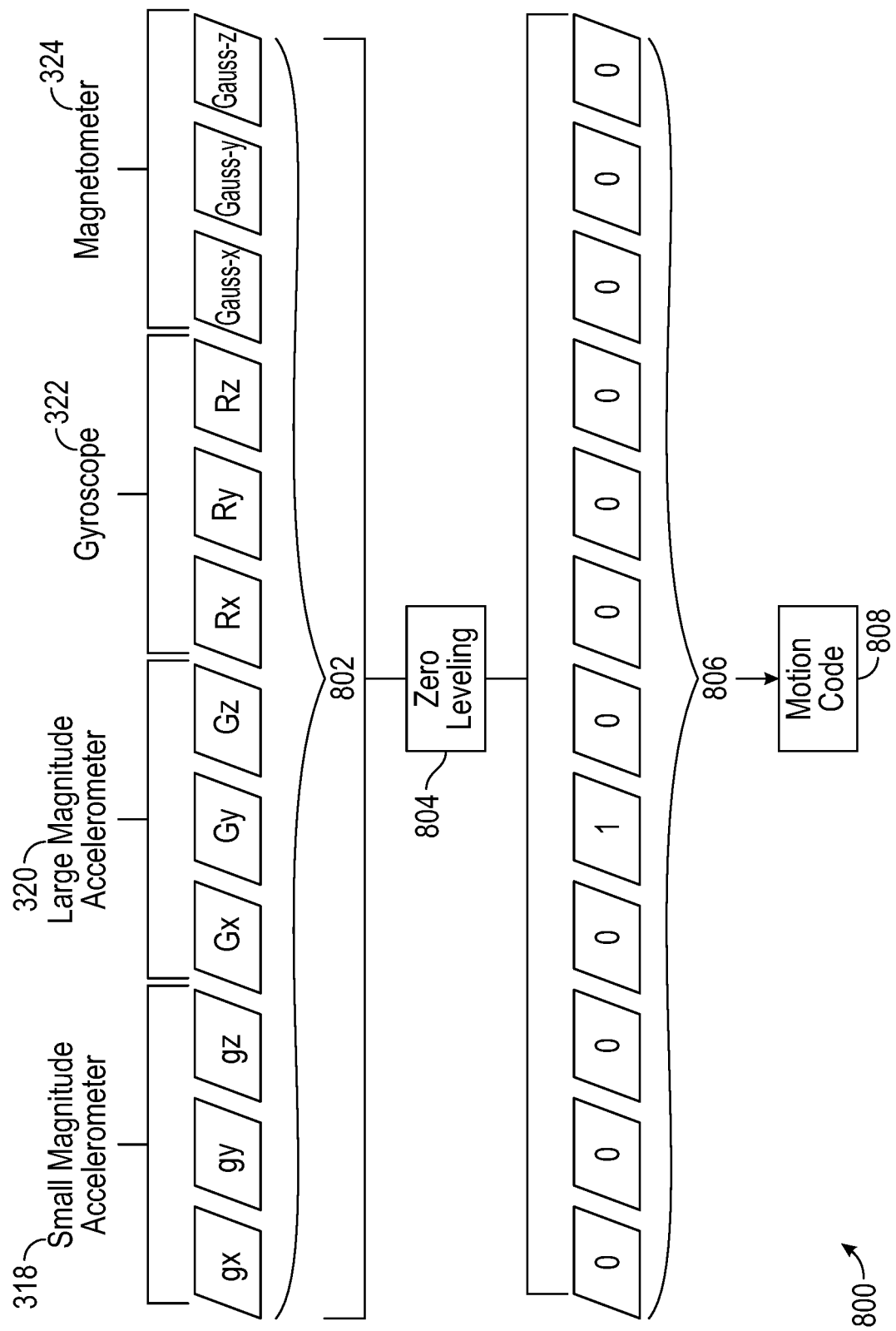
FIG. 8 illustrates a decoding module for categorizing events for some embodiments.

FIG. 8 illustrates decoding module 800 for decoding received sensor data from data collection device 100. Decoding module 800 may be used in conjunction with the analysis engine or may be integrated with the analysis engine. In some embodiments, the analysis engine comprises decoding module 800 and one or more neural networks. Decoding module 800 may be configured to analyze the received sensor data and to classify the sensor data into an event or into multiple events. As depicted, decoding module 800 receives data values 802 from each of accelerometers 321, gyroscope 322, and magnetometer 324. In some embodiments, the data from each sensor is provided to decoding module 800 for each of the x-axis, the y-axis, and the z-axis. In some embodiments, the sensor data is converted to a vector before being analyzed by decoding module 800.

Once the sensor data has been received, each data value (or a subset of the data values, e.g., every other received data value) may undergo a zero-levelling process at zero-levelling block 804. At zero-levelling block 804, each data value may be compared to a threshold as described above. In some embodiments, the threshold value varies for each sensor. In some embodiments, the threshold value varies for each of the x-axis, the y-axis, and the z-axis. Zero-levelling block 804 may then classify each data value depending on whether the data value falls above or below the threshold value. In some embodiments, the absolute value of data values 802 is compared to the threshold value. As such, after the plurality of data values passes through zero-levelling block 804, each data value may be represented by a one or a zero, as depicted at transformed data values 806.

Each of transformed data values 806 may then be passed to encoding block 808. In some embodiments, encoding block 808 may be used to identify the type of motion associated with firearm 202. For example, encoding block 808 may have already encoded two events from a set of data: an unholstering of firearm 202 and an aiming of firearm 202. Encoding block 808 may then receive the same array of values that was categorized as a holster movement for transformed data values 806 as described above. However, instead of decoding module 800 also encoding the event with the same array of values that was categorized as a holster movement as another holster movement, encoding block 808 may instead encode the event as an actuation of safety 204. Decoding module 800 may utilize context from previously categorized events to help categorize future events. Because the analysis engine may learn various patterns from previously received data, the analysis engine may be operable to understand that identical arrays may represent separate events depending on the context of the event.

In some embodiments, decoding module 800 can detect various events from data received by data collection device 100. For example, a finger may be placed on trigger 206. The finger placement may result in a small force applied in the y-direction detected by low-force accelerometer 318 and may be accompanied by a slight rotation of firearm 202 around the x-axis detected by gyroscope 322. As such, the data set from the finger placement may be thresholded and transformed data values 806 may comprise an array with ones for $g_y$ and $R_y$ and zeroes everywhere else. The analysis engine may then analyze this array and determine that this array represents a finger placement. The analysis engine may compare the received array to a set of historical arrays to help make the determination.

As another example, decoding module 800 may decode the event of a bullet being chambered into firearm 202. For some firearms 202, a slide must be racked in order to chamber the first bullet in a clip. Racking the slide may cause a force to be detected by accelerometers 321 in the z-direction. An upwards rotation, detectable by gyroscope 322, may also result when the slide is racked. Accordingly, a dataset of a slide rack may be thresholded at zero leveling block 804 and may produce an array comprising ones for $G_y$ and $R_y$. Thus, the analysis engine may analyze the array and categorize the array as a slide rack. As described above, the analysis engine may use context from previous events to categorize events. For example, if the previous event categorized by decoding module 800 was a clip change to reload firearm 202, it is likely that the next data set received from data collection device 100 is indicative of the slide being racked to chamber the first bullet in the new clip.

In some embodiments, decoding module 800 may analyze actual data values 802 along with transformed data values 806 to categorize the event. Because of the binary representation of transformed data values 806, a negative value for data values 802 may not be captured by zero-levelling block 804. As such, the analysis engine may also analyze data values 802 to determine if any of the values are negative when categorizing events. For example, a value of one for the y-direction of high-force accelerometer 320 in transformed data values 806 may represent a large acceleration; however, the one could represent either the positive or negative y-direction. As such, decoding module 800 may analyze the raw acceleration number of data value 802 to determine if the acceleration occurred in the positive y-direction or in the negative y-direction. In some embodiments, zero-levelling block 804 may encode negative values whose absolute value lies above the threshold value as a negative one.

In some embodiments, decoding module 800 may decode the received data in a time-series manner. Decoding module 800 may output an event together with a timestamp and/or a length of time of the event. Once any value in the array of transformed data values 806 changes, decoding module 800 may recognize the change in the array as a separate event and categorize it as such. In some embodiments, decoding module 800 may output and/or store an event together with a timestamp and/or a length of time of the event. The analysis engine may be configured to generate a confidence score for each event classified by decoding module 800. Decoded events that fall below a confidence score threshold (e.g., 95% confidence) may be flagged by the analysis engine for further review. A reviewer may then analyze the raw data along with any external data, such as video data from camera 104, to correctly classify the event. In such a way, the analysis engine and decoding module 800 may be better trained to classify events.

Figure 9:
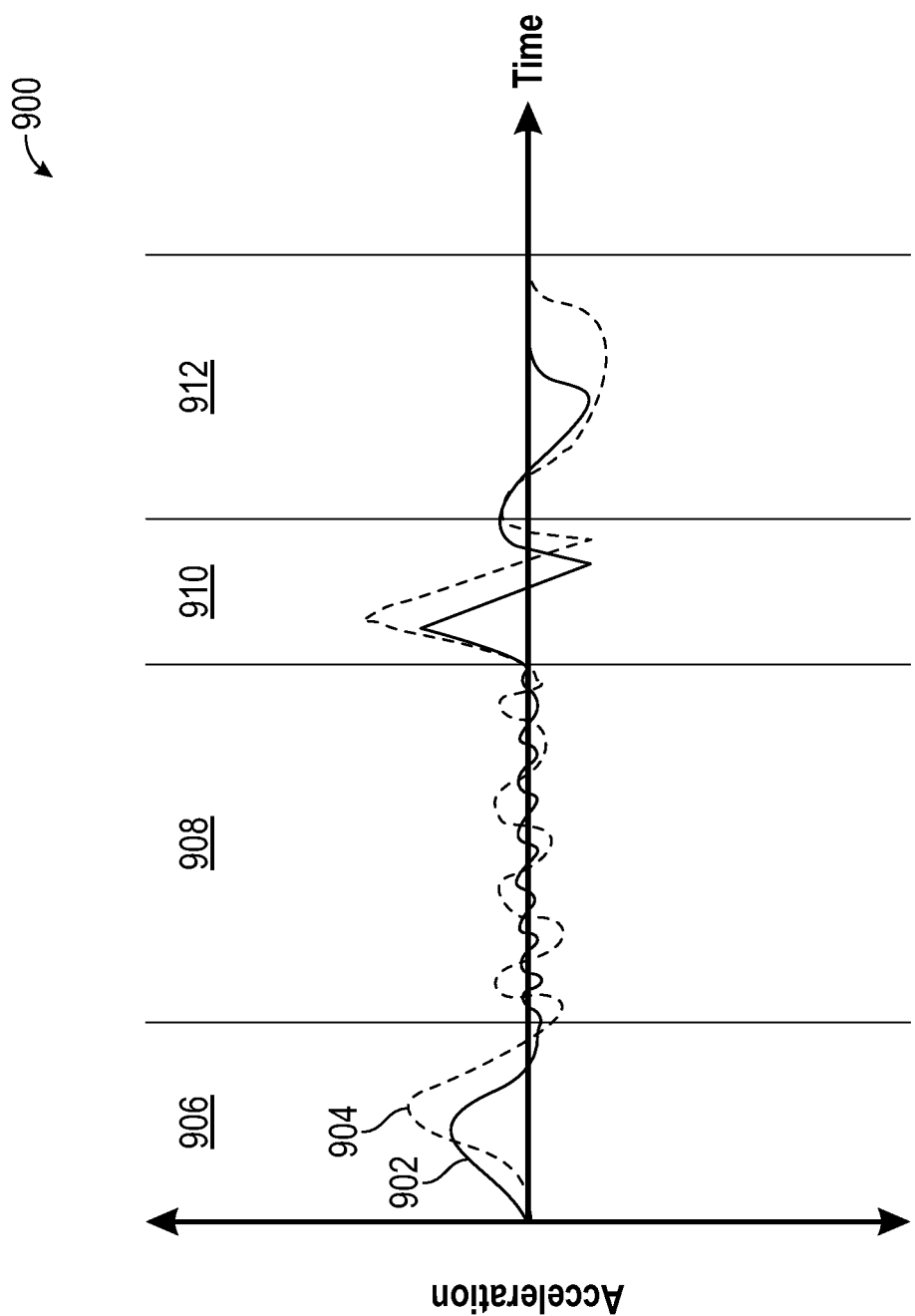
FIG. 9 depicts an example graphical output of the data collected by the data collection device that may be used to create a user profile for some embodiments.

FIG. 9 depicts an example graph 900 output for some embodiments. Graph 900 depicts a simplified version of the data that may be received from the sensors 325 associated with data collection device 100. In this example, graph 900 depicts time on the x-axis and acceleration in the vertical direction along the y-axis. In some embodiments, data for graph 900 may be received from low-force accelerometer 318 or high-force accelerometer 320 or a combination of the two. Two separate data sets for two separate users are displayed to illustrate how the analysis engine may decode separate data sets and create profiles for various users. The data for first user 902 is represented with a solid line, and the data for second user 904 is represented with a dashed line.

Graph 900 may be split into separate regions for separate events. As shown, graph 900 comprises a plurality of regions, with each region corresponding to a separate event. Unholstering region 906 depicts the event of unholstering firearm 202; aiming region 908 depicts the event of aiming firearm 202; shot fired region 910 depicts a fired shot; and holstering region 912 depicts the event of holstering firearm 202. Looking first at unholstering region 906, it can be seen that the acceleration of first user 902 is lower than that of second user 904, and that the acceleration for second user 904 returned to zero quicker than it did for first user 902 indicating that first user 902 withdrew firearm 202 quicker than second user 904 and with less force than second user 904. Other discrepancies between the movement of first user 902 and second user 904 during the events can be seen in aiming region 908, shot fired region 910, and holstering region 912. As shown, first user 902 has less variation in movement while aiming and has less acceleration when the shot is fired. The data for first user 902 may indicate that first user 902 is an experienced user who understands how to correctly aim the weapon and to control the recoil from a fired shot. Contrarily, second user 904 has more erratic aiming acceleration, and a higher acceleration for the fired shot. As such, the analysis engine may determine second user 904 is a less experienced shooter.

Based on historical data for first user 902, data collection device 100 may have generated a profile for first user 902 and learned that first user 902 typically handles firearm 202 in such a way to substantially produce the depicted graph every time. The generated profile may store habits related to the way first user 902 handles firearm 202. For example, the generated profile, based on manipulations of firearm 202 recorded by data collection device 100, may learn that first user 902 typically unholsters firearm 202 at a speed range of 4-5 ft/s and in a time range of 0.2-0.5 seconds. The profile may comprise various other information such as typical angle first user 902 fires the weapon at relative to the ground. The profile may be generated in part by utilizing results from decoding module 800.

Once the analysis engine receives the illustrated data set from second user 904, the analysis engine may flag the data set from second user 904 as erroneous. In some embodiments, the analysis engine compares each received data set to the generated profile and classifies any data set that varies by more than an error threshold as erroneous. In some embodiments, the analysis engine calculates a confidence score based on the decoded data from decoding module 800 and the comparison to the generated profile. For example, the set of data from second user 904 may be compared to the generated profile for first user 902, and the analysis engine may determine with 96% confidence that second user 904 is a different person than first user 902. Thus, the analysis engine may flag the second set of data from second user 904 as erroneous. The confidence score may be calculated using typical statistical methods. In some embodiments, the erroneous data set may be indicative that the set of data was not received from first user 902.

Generally, the comparison of two data sets will be useful when one data set attributed to a user is inconsistent with previously received data sets. Consider, for example, first user 902 is law enforcement officer 402, and second user 904 is suspect 412 from FIG. 4. During the encounter, a struggle over possession of handgun 404 may occur. Both law enforcement officer 402 and suspect 412 may fire a shot. When the analysis engine receives the shot data from suspect 412 firing a shot, the analysis engine may flag the shot data from suspect 412 as suspicious or aberrational because it does not match the typical set of data received from law enforcement officer 402 firing a shot. Because the data collection device 100 stores data for firearm 202 and creates a profile for the user, data collection device 100 may recognize that the shot fired by suspect 412 does not match the created shooting profile for law enforcement officer 402. In some embodiments, the analysis engine may compare each set of data to an error range to determine if the set of data should be flagged for further investigation. As such, a reviewer may view the flagged set of data and may use the flagged set of data to corroborate the facts of the encounter. The analysis engine may also flag shot data from officer 402 as aberrational if the data varies by more than a threshold amount. For example, due to the struggle between law enforcement officer 402 and suspect 412, it may take law enforcement officer 402 twice as long to unholster handgun 404, which may be categorized by the analysis engine for further investigation. Variations in shot angle and linear motion of handgun 404 may be highly indicative of a situation in which there was a struggle over handgun 404.

As another example, the graphical data may be useful for correcting shooting form. Second user 904 may instead be a civilian using data collection device 100 as a marksmanship aid. Second user 904 may view the graphical outputs of the data and use the data to determine where the shooting form can be improved. In some embodiments, data collection device 100 and the analysis engine may be configured to flag graphical regions of the shooting data that may indicate poor shooting form. For example, regions may be highlighted or otherwise called out such that second user 904 may understand which parts of the shooting form need to be improved. During the training process of the analysis engine, the analysis engine may learn a range of values that indicate proper shooting form. For example, the analysis engine may learn that users who take longer than 1 second to unholster a firearm should be prompted to improve their unholstering speed and technique.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for attaching to a firearm and recording, analyzing, and categorizing events associated with the firearm, the system comprising:
   a plurality of sensors coupled to the firearm and configured to detect a manipulation of the firearm,
   wherein the plurality of sensors includes a first triaxial accelerometer configured to measure g-forces of a first magnitude, a second triaxial accelerometer configured to measure g-forces of a second magnitude, a triaxial gyroscope, and a triaxial magnetometer;
   at least one processor communicatively coupled to the plurality of sensors;
   a data store; and
   one or more non-transitory computer-readable media storing computer-executable instructions that, when executed by the at least one processor, cause the system carry out actions comprising:
   detecting, via at least one of the plurality of sensors, the manipulation of the firearm;

in response to the detection, recording a set of data points using the plurality of sensors,
wherein the set of data points comprises at least three acceleration values from the first triaxial accelerometer, at least three acceleration values from the second triaxial accelerometer, at least three angular velocity values from the triaxial gyroscope, and at least three magnetic field values from the triaxial magnetometer;
binarizing the set of data points by comparing each data point in the set of data points to a respective threshold value to obtain a binary array; and
categorizing the set of data points into at least one event based on the binary array.

2. The system of claim 1,
wherein the system further comprises a video camera; and
wherein the computer-executable instructions are further executed to perform:
in response to the detection of the manipulation of the firearm, triggering the video camera to record a set of video data.

3. The system of claim 2, wherein the actions further comprise:
encrypting the set of data points to obtain an encrypted set of data points;
encrypting the set of video data to obtain an encrypted set of video data; and
storing the encrypted set of data points and the encrypted set of video data with an associated set of metadata.

4. The system of claim 1, wherein the manipulation of the firearm is an unholstering of the firearm.

5. The system of claim 1, wherein the at least one event is one of an actuation of a safety on the firearm, a placing of a finger on a trigger, or a shot fired by the firearm.

6. The system of claim 1, wherein the actions further comprise:
in response to the detection, triggering at least one external sensor to begin recording a set of external sensor data.

7. The system of claim 1, wherein the set of data points is a first set of data points, the binary array is a first binary array and wherein the actions further comprise:
responsive to receiving a second set of data points after the first set of data points, binarizing the second set of data points to obtain a second binary array; and
categorizing the second set of data points into a second event based on the second binary array and the at least one event.

8. A method for recording, analyzing, and categorizing events associated with a firearm, the method comprising:
detecting, by a plurality of sensors coupled to the firearm, a manipulation of the firearm,
wherein the plurality of sensors includes a first triaxial accelerometer configured to measure g-forces of a first magnitude, a second triaxial accelerometer configured to measure g-forces of a second magnitude, a triaxial gyroscope, and a triaxial magnetometer;
in response to the detection of the manipulation of the firearm, recording a set of data points by the plurality of sensors,
wherein the set of data points comprises at least three acceleration values from the first triaxial accelerometer, at least three acceleration values from the second triaxial accelerometer, at least three angular velocity values from the triaxial gyroscope, and at least three magnetic field values from the triaxial magnetometer;
binarizing the set of data points by comparing each data point in the set of data points to a respective threshold value to obtain a binary array; and
categorizing the set of data points into at least one event based on the binary array.

9. The method of claim 8, wherein each of the plurality of sensors is a microelectromechanical system (MEMS) sensor.

10. The method of claim 8, wherein the method further comprises:
in response to the detection of the manipulation of the firearm, triggering a body-worn camera associated with the firearm to begin recording a set of video data.

11. The method of claim 10, wherein the method further comprises:
encrypting the set of data points to obtain an encrypted set of data points;
encrypting the set of video data from the body-worn camera to obtain an encrypted set of video data; and
storing the encrypted set of data points and the encrypted set of video data with a set of metadata associated with the encrypted set of data points and the encrypted set of video data.

12. The method of claim 8, wherein the manipulation of the firearm is a first manipulation; and wherein the method further comprises:
detecting, by the plurality of sensors, a second manipulation of the firearm; and
in response to the detection of the second manipulation, ending the recording of the set of data points.

13. The method of claim 12, wherein the second manipulation of the firearm is a holstering of the firearm.

14. The method of claim 8, wherein the method further comprises generating a profile indicative of a set of firearm handling habits based at least in part on the set of data points.

15. The method of claim 14, wherein the method further comprises:
comparing the set of data points to the profile to determine if the set of data points varies by more than a threshold value; and
in response to determining that the set of data points varies by more than a threshold value, classifying the set of data points as erroneous based on the detection that the set of data points varies by more than the threshold value.

16. One or more non-transitory computer-readable media storing computer-executable instructions, that when executed by at least one processor, perform a method of recording, analyzing, and categorizing events associated with a firearm, comprising:
detecting, by a plurality of sensors coupled to the firearm, a manipulation of the firearm by a user,
wherein the plurality of sensors includes a first triaxial accelerometer configured to measure g-forces of a first magnitude, a second triaxial accelerometer configured to measure g-forces of a second magnitude, a triaxial gyroscope, and a triaxial magnetometer;
in response to the detection, recording a set of data points from the plurality of sensors,
wherein the set of data points comprises at least three acceleration values from the first triaxial accelerometer, at least three acceleration values from the second triaxial accelerometer, at least three angular velocity values from the triaxial gyroscope, and at least three magnetic field values from the triaxial magnetometer;
binarizing the set of data points by comparing each data point in the set of data points to a respective threshold value to obtain a binary array;

categorizing the set of data points into at least one event based on the binary array;
storing the set of data points in a data store; and
generating a profile indicative of firearm handling habits associated with the user based at least in part on the set of data points.

17. The media of claim 16, wherein the manipulation of the firearm is one of an actuation of a safety on the firearm, an unholstering of the firearm, or an aiming of the firearm.

18. The media of claim 16, wherein the computer-executable instructions are further executed to present a graphical output of the set of data points.

19. The media of claim 16,
wherein the computer-executable instructions are further executed to perform a step of storing a set of metadata associated with the set of data points in the data store, and
wherein the set of metadata comprises at least one of a time, a date, or a GPS location.

20. The media of claim 16, wherein the set of data points is a first set of data points, the binary array is a first binary array, and wherein the computer-executable instructions are further executed to perform steps of:
responsive to receiving a second set of data points after the first set of data points, binarizing the second set of data points to obtain a second binary array; and
categorizing the second set of data points into a second event based on the second binary array and the at least one event.

* * * * *